United States Patent

[11] 3,614,232

[72] Inventor Einar S. Mathisen
Poughkeepsie, N.Y.
[21] Appl. No. 778,526
[22] Filed Nov. 25, 1968
[45] Patented Oct. 19, 1971
[73] Assignee International Business Machines Corporation
Armonk, N.Y.

[54] PATTERN DEFECT SENSING USING ERROR FREE BLOCKING SPACIAL FILTER

6 Claims, 10 Drawing Figs.

[52] U.S. Cl. 356/71, 250/219 DF, 350/162 SF, 356/168, 356/237, 356/239
[51] Int. Cl. G01n 21/32
[50] Field of Search 356/168, 71, 237, 238, 239; 250/219 DF; 350/3.5, 162 SF

[56] References Cited

UNITED STATES PATENTS

| | | | |
|---|---|---|---|
| 3,085,469 | 4/1963 | Carlson | 350/162 SF |
| 3,418,626 | 12/1968 | Farr et al. | 340/15.5 |
| 1,135,919 | 4/1915 | Pilkington | 356/168 X |

*Primary Examiner*—Ronald L. Wibert
*Assistant Examiner*—Orville B. Chew, II
*Attorneys*—Hanifin and Clark and Robert J. Haase

ABSTRACT: Defects in microcircuit patterns are sensed by illuminating the pattern with monochromatic collimated light. The illuminated pattern is imaged through a lens to produce substantially a two-dimensional optical Fourier transform of the pattern at a plane on the output side of the lens. An optical filter (transparency) which includes substantially the negative of the Fourier transform of a defect-free specimen of the microcircuit is placed at the aforesaid plane to block the optical frequency components corresponding to the defect-free specimen. Light passing through the filter is processed to provide various indications of the pattern defects.

*INVENTOR*
EINAR S. MATHISEN

*BY* Robert J. Haase
*ATTORNEY*

PATTERN DEFECT SENSING USING ERROR FREE BLOCKING SPACIAL FILTER

BACKGROUND OF THE INVENTION

As is well known in the microcircuit manufacturing art, the processes for producing and utilizing masks for diffusion and other purposes have not yet been brought under complete control. Masks sometimes contain pattern defects which cause microcircuit malfunctions only after considerable circuit use has taken place. It is desirable, of course, that a way be found to detect in advance the latent tendency of a finished microcircuit towards such a delayed failure.

In accordance with prior art practice, masks and the microcircuits resulting from the use of the masks have been individually visually inspected with painstaking care in order to determine the presence of any pattern irregularities that might cause delayed microcircuit failure. Visual inspection is greatly handicapped by the difficulty in distinguishing between the normal pattern of the circuit configuration and any undesired deviations therefrom. Special training and skill are required to detect pattern defects with reliability and efficiency. A substantial advance in the detection of pattern imperfections could be realized if the error-free portion of the total microcircuit pattern were dimmed or suppressed relative to the defective portion of the pattern image under inspection.

SUMMARY OF THE INVENTION

In accordance with the present invention, substantially an optical Fourier transform of a microcircuit specimen pattern under examination is imaged on an optical filter containing substantially the negative of the Fourier transform of an error-free microcircuit reference pattern. The filter blocks the spatial frequencies corresponding to the error-free portion of the specimen pattern under examination and transmits only those spatial frequencies outside the error-free spectrum which, by definition, correspond to the defects to be sensed. In a simple case, the transmitted light is focused upon a photodetector to actuate a "go, no-go" alarm. Alternatively, the transmitted light may be imaged upon a vidicon to provide a closed circuit television display in which pattern defects are brightly displayed in strong contrast against a background comprising a dimmed outline of the error-free portion of the specimen pattern. Not only the presence of the defects but their location as well can be quickly and reliably determined from the television display. A feature of the invention attributable to the use of the Fourier transform is that there is no need for close registration of the specimen pattern relative to the reference pattern. In accordance with another aspect of the invention, the coordinates of each defect are derived for the automatic determination of whether the defects lie in critical areas of the microcircuit or in noncritical locations where the defects can be tolerated.

DESCRIPTION OF THE PREFERRED EMBODIMENTS

Figure 1:
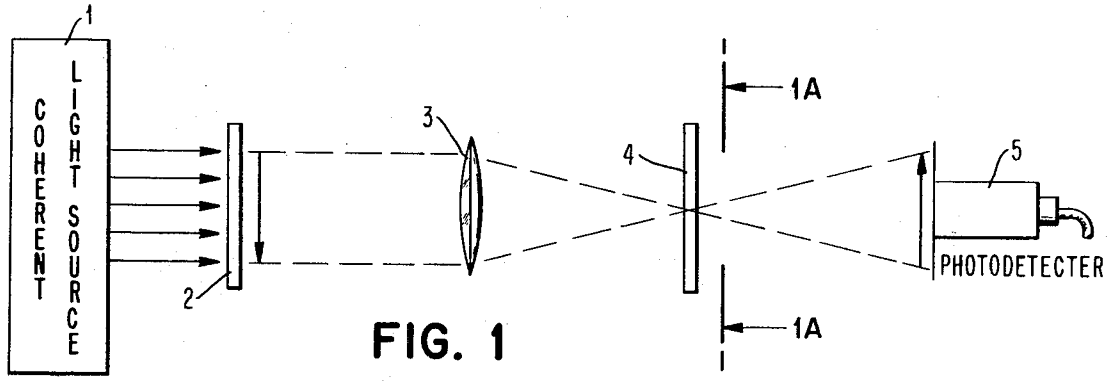
FIG. 1 is a simplified schematic diagram of a basic embodiment of the invention designed for the inspection of microcircuit mask patterns.

Microcircuit pattern defects sensed by the apparatus of the present invention may be defects which appear in the masks themselves or upon the finished microcircuits produced with the aid of such masks. In the embodiment of FIG. 1, provision is made for the inspection of masks. Coherent light source 1 provides a monochromatic collimated light beam for illuminating specimen mask 2. Mask 2 may be either a photographic transparency or a metal mask in which apertures have been etched. The light transmitted by mask 2 is imaged on filter 4 by lens 3. Filter 4 is placed a distance equal to a focal length behind lens 3.

Figure 1A:
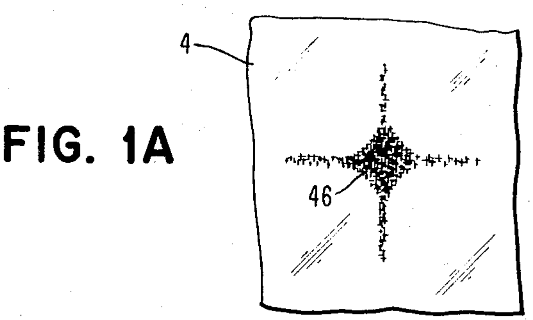
FIG. 1A is a view of a typical Fourier transform spatial frequency filter used in the apparatus of FIG. 1.

As shown in FIG. 1A, the optical filter 4 comprises a typical two-dimensional Fourier transform of a known error-free reference mask against which specimen mask 2 is compared in the embodiment of FIG. 1. Mask 4 is opaque in those areas corresponding to the spatial frequency components of the error-free Fourier transform. Mask 4 is transparent in those other areas corresponding to spatial frequencies not included in the error-free Fourier transform. Consequently, if the Fourier transform of the specimen mask is imaged upon filter 4, substantially all of the optical frequencies corresponding to the error-free portion of the specimen pattern are blocked and only the remaining optical frequency components corresponding to defects in the specimen pattern are transmitted through filter 4. The light which is transmitted through filter 4 is sensed by photodetector 5 whose output may be utilized to operate a "no-go" alarm.

Objective lens 3 is of suitable numerical aperture and magnification power to cover the area of mask 2. Lens 3 is placed a distance from mask 2 equal to the working distance for which the lens was designed. In some instances where no magnification or a different magnification and/or defect detection power is required, the distance of lens 3 from mask 2 may be altered to suit the space bandwidth requirement. When the distance is made equal to the front focal length, an exact two-dimensional Fourier transform of the pattern of specimen mask 2 is produced at the location of filter 4. In such a case, a second lens, (not shown in FIG. 1) must be introduced between the positions of filter 4 and photodetector 5 to produce the inverse Fourier transform of the light transmitted through filter 4 in order that a true image of the specimen mask defects may be produced at the position of photodetector 5. An exact Fourier transform of the mask pattern under examination is not produced when only a single lens, such as lens 3, is used in the embodiment of FIG. 1. However, a substantially correct Fourier transform is produced differing from the precise transform only to the extent of certain phase displacements of the constituent spatial frequency components. In this regard, it should also be understood that the present invention does not necessarily require that the optical filter 4 consist of the precise Fourier transform of the mask pattern under examination. As a practical matter, the precise Fourier transform cannot be achieved in actual practice. Physically realizable photographic film or etched metallic plate Fourier transform filters will not completely block every spatial frequency component of the Fourier transform of the error-free mask. To some extent frequencies corresponding to the error-free portion of the mask will be transmitted. It is sufficient, for purposes of the present invention, that at least the lower frequency components of the precise Fourier transform are blocked by the filter if the higher frequency components thereof are permitted to pass through.

The transmission of the higher frequency components through the mask is even desirable in some cases as where photodetector 5 is a vidicon and the output of the vidicon is displayed on a closed circuit television receiver. An observer looking at the television receiver would see not only the defects in the mask under examination but would also see with diminished intensity the outline of the defect-free portion of the mask. The dimmed outline of the defect-free portion permits the observer to locate the defects with respect to the total pattern under examination. In the case of the embodiment of FIG. 4, where the coordinates of the defects are ascertained automatically with respect to the center of the mask under examination, it is preferred that the most nearly exact Fourier transform by employed in order to minimize the amount of the error-free spatial frequency components that pass through the filter. The substantially complete blocking of the error-free frequency component eliminates detection of other than defect signals.

Figure 2:
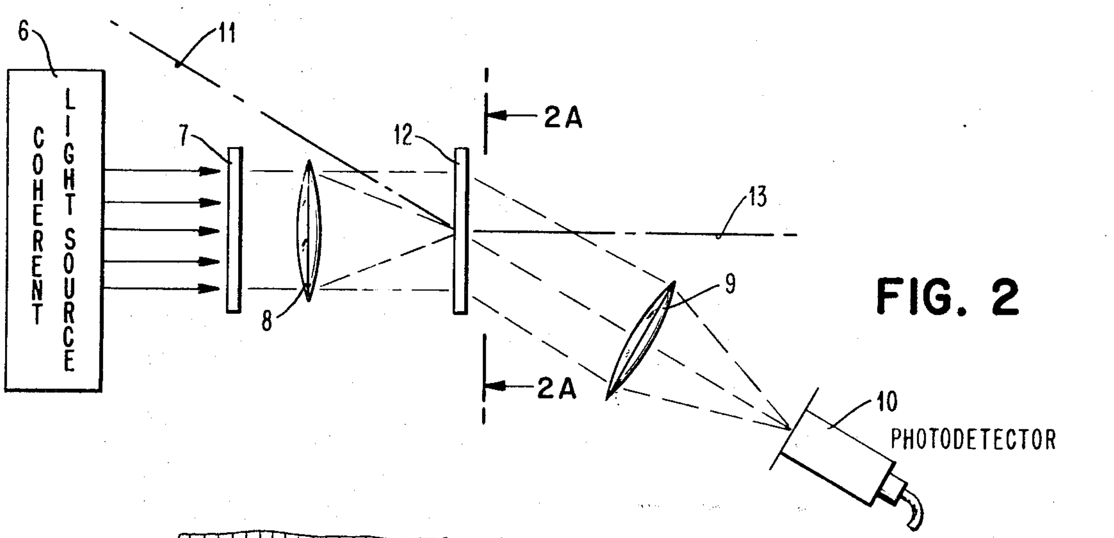
FIG. 2 is a simplified schematic diagram of an alternative embodiment of the invention for inspecting microcircuit mask patterns.
Figure 2A:
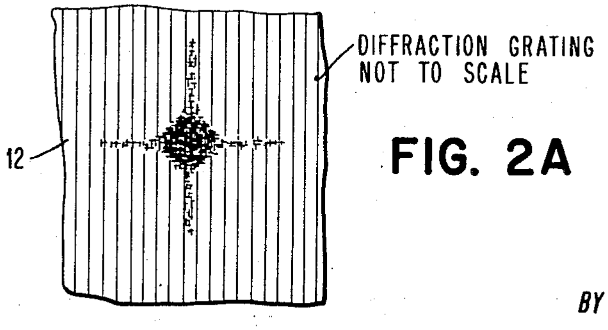
FIG. 2A is a view of the superimposed diffraction grating and Fourier transform comprising the optical filter utilized in the apparatus of FIG. 2.

The embodiment of FIG. 2 is generally similar in structure and operation to the embodiment in FIG. 1 with the exception of the optical filter 12. It will be noticed that although the components of the optical system depicted in FIG. 1 lie along a straight optical axis, components 9 and 10 of the embodiment of FIG. 2 lie along an axis 11 which is inclined relative to the axis 13 of component 6, 7 and 8. The inclined axis 11 in FIG. 2 is the result of using the spatial frequency filter 12 of FIG. 2A rather than the filter of FIG. 1A. The filter 12 of FIG. 2A actually is a composite of a diffraction grating and a two-dimensional Fourier transform of the mask 7 under examination. The diffraction grating portion of filter 12 is produced in the following conventional manner. A pinhole light source is placed at the front focal plane of lens 8 while a reference coherent colimmated light source of the same frequency is directed along axis 11 toward a photographic plate placed at the position of filter 12 at the back focal plane of lens 8. The photographic plate is exposed to the interference pattern which is a hologram of the pinhole coherent light source. The photographic plate then is exposed a second time after the reference coherent light source is removed and the pinhole light source is replaced by the coherent light source 6 with the error-free mask in position 7. The second exposure produces the Fourier transform pattern typified by FIG. 1A. The development of the photographic plate yields the composite diffraction grating Fourier transform of FIG. 2A.

As before, the spatial frequency components corresponding to the error-free portion of the specimen mask are blocked by the opaque Fourier transform portion of filter 12. Other spatial frequencies attributable to defects in the mask pass through the portion of filter 12 which is ruled by the diffraction grating lines. The diffracted error frequency components transmitted through filter 12 are imaged by lens 9 on photodetector 10.

Frequency components corresponding to the error-free portion of the mask pattern under examination ideally are blocked but to the extent that they are not, they pass through filter 12 at locations within the Fourier transform portion of the filter where no diffraction grating lines exist. Consequently, such optical frequency components continue to propagate along optical axis 13 and are not imaged by lens 9 on photodetector 10. Thus, the embodiment of FIG. 2 affords a measure of discrimination between the error-free signal components and the defect signal components beyond that achieved by FIG. 1.

Figure 3:
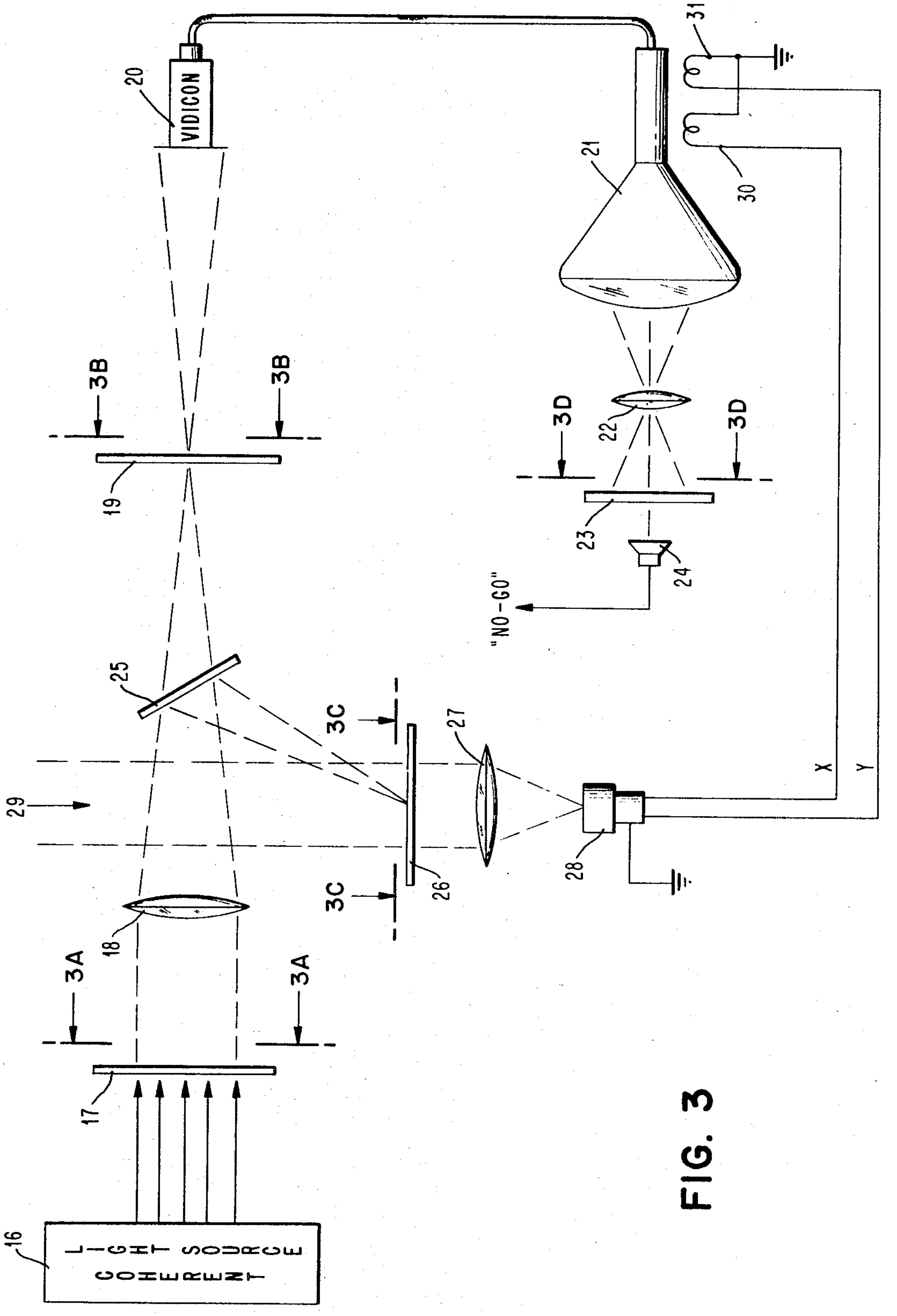
FIG. 3 is a simplified schematic diagram of an embodiment adapted for the automatic determination of microcircuit mask pattern defects in critical pattern areas.
Figure 3A:
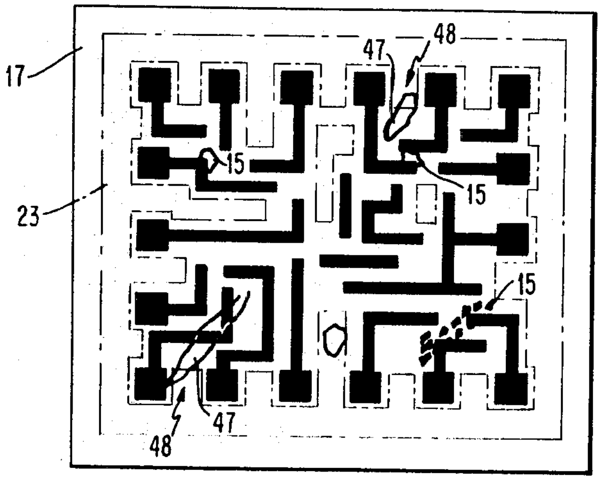
FIG. 3A shows the microcircuit mask pattern under examination in the embodiment of FIG. 3.

The embodiment represented in FIG. 3 is specially adapted for the detection of defects in preselected critical areas of the mask under examination. Defects which are present in the mask but located in areas which are noncritical (in the sense that no circuit malfunctions are attributable thereto) are not sensed. The specimen mask 17 under examination is represented in FIG. 3A. The critical areas of the mask 17 of FIG. 3A are represented by the transparent portions of the mask 23 of FIG. 3D. It will be noted that several defects are shown in mask 17. Only those defects such as defects 15 of mask 17 and the portions 47 of defects 48 which are in registration with the transparent portions of critical area mask 23 are sensed by the system.

Figure 3B:
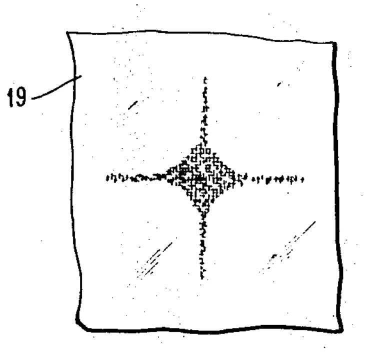
FIG. 3B shows a typical optical filter used in the embodiment of FIG. 3 for suppressing the error-free portion of the mask pattern under examination.

As in the case of FIG. 1, coherent light source 16 illuminates specimen mask 17 with monochromatic collimated light. Lens 18 produces substantially the Fourier transform of the mask pattern on optical filter 19 which is shown in FIG. 3B and is of the same type as shown in FIG. 1A. As before, the optical frequency components corresponding to the defects in the mask pattern under examination are detected to the exclusion of the error-free frequency components. Detection is accomplished by vidicon 20 whose output signals are displayed on the cathode-ray tube 21 of a closed circuit television receiver. Defects displayed on the face of cathode tube 21 are directed by lens 22 through critical area mask 23 to photodetector 24.

Figure 3C:
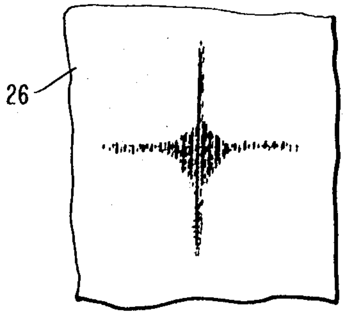
FIG. 3C shows a typical optical filter used in the embodiment of FIG. 3 for determining the position of the mask pattern under examination with respect to the optical axis of the inspection apparatus.
Figure 3D:
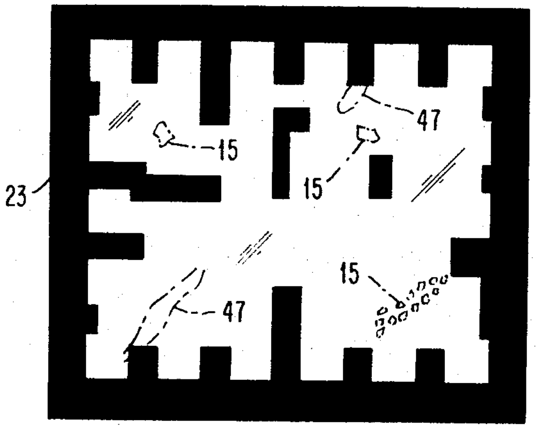
FIG. 3D shows the apertured mask used in the embodiment of FIG. 3 for delineating the critical areas in the pattern of FIG. 3A.

In order to avoid the necessity of carefully aligning the mask under inspection with the optical axis of the defect detection system, provision is made for ascertaining the deviation of the mask center from the optical axis and then offcentering the display or cathode-ray tube 21 accordingly. This is achieved with the aid of beam splitter 25, Fourier transform hologram filter 26, lens 27 and quadrant detector 28. The Fourier transform hologram filter 26 is constructed on a photographic plate or film from a defect free reference mask pattern placed at the location of mask 17, while a coherent collimated reference beam is directed along axis 29′ toward the photographic plate which is placed at the location of filter 26. The plate receives the Fourier transform image of a defect free mask via the light reflected from beam splitter 25 and also receives the reference light beam directed along axis 19′ through the beam splitter 25. The interference pattern resulting from the two beams of light produces a Fourier transform hologram on the photographic plate. It should be observed that the diffraction grating lines are inside the Fourier transform pattern as shown in FIG. 3C, whereas the diffraction grating lines are outside the Fourier transform pattern in the case of the filter 12 previously described in connection with FIG. 2A.

The Fourier transform hologram filter 26 causes the spatial frequency components corresponding to the error-free pattern to be imaged at a single spot on the face of quadrant detector 28 at a location representing the deviation of the center of the specimen mask 17 from the optical axis of the defect-sensing system. Quadrant detector 28 provides a pair of output signals in a conventional manner representing the X and Y coordinates of the deviation of the center of the specimen mask 17 from the optical axis and applies these signals to the X- and Y-beam-centering coils 30 and 31. The result is that the image on cathode-ray tube 21 is shifted a corresponding amount allowing the image of the area viewed by the vidicon to be positioned at the correct location on the critical area mask 23. The image displayed by the cathode-ray tube 21 automatically is kept in registration with the critical area mask 23 whereby only light corresponding to defects which are in noncritical areas of the mask 17 under examination are passed through mask 23 and reach photodetector 24. It should be noted that although the embodiment of FIG. 3 uses the optical filtering technique of FIG. 1 to accomplish defect detection, the optical filtering technique of FIG. 2 is equally applicable.

Figure 4:
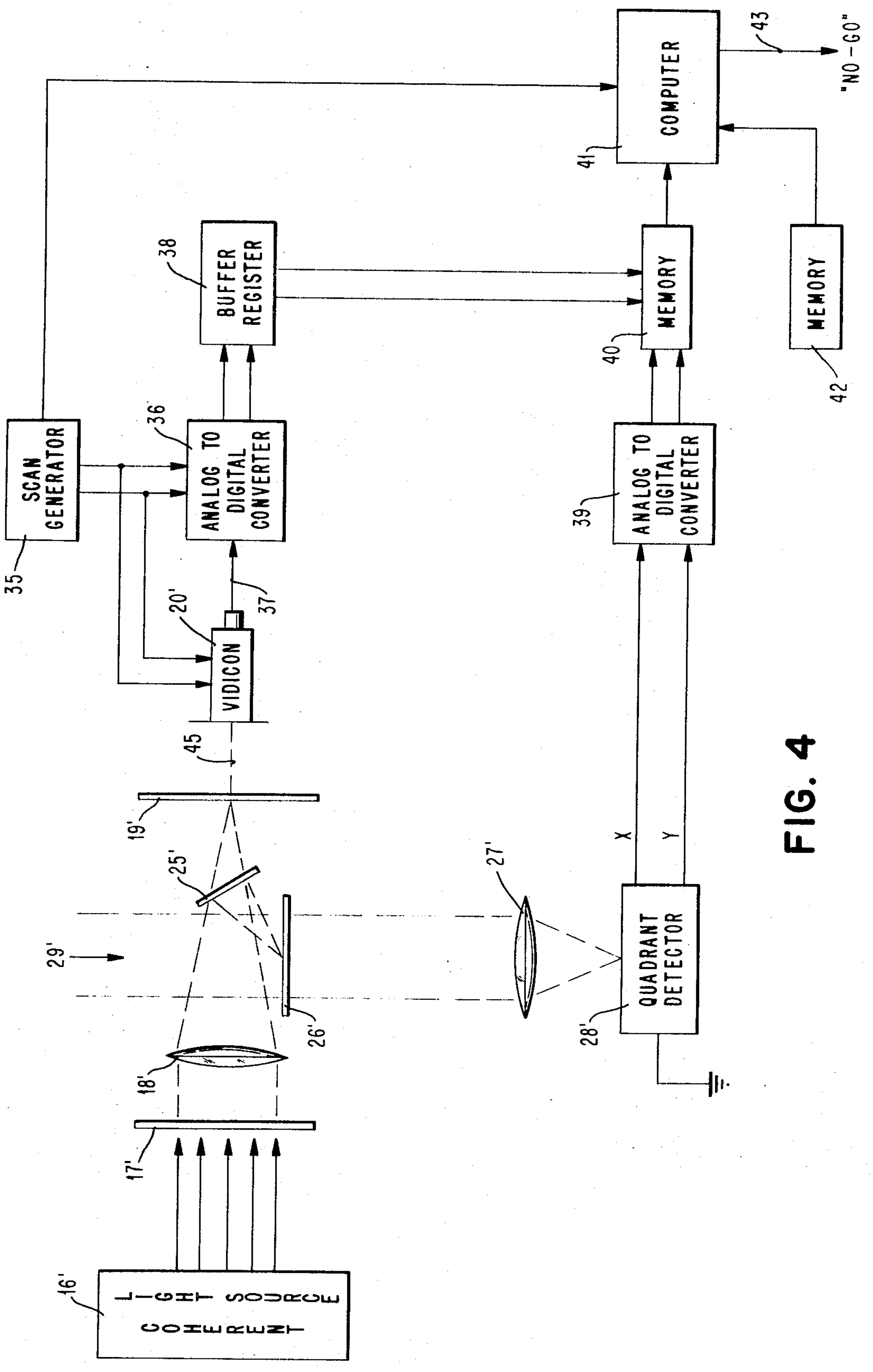
FIG. 4 is a simplified block diagram of a digitalized embodiment for automatically determining the presence and criticality of the defects.

The embodiment of the present invention shown in FIG. 4 performs the function of the embodiment of FIG. 3 but with the aid of entirely digital rather than analog components. The components of FIG. 4 corresponding to those of FIG. 3 are designated by the same but primed numbers. Vidicon 20′ produces output signals representing the detected defects in the manner described with respect to vidicon 20′ of FIG. 3. Quadrant detector 28′ of FIG. 4 provides a pair of output X- and Y-signals in the manner of quadrant detector 28 of FIG. 3 representing the deviation of the center of the mask under examination from the optical axis 45 of the defecting system. Scan generator 35 causes vidicon 20′ to sweep the defect images. The X and Y sweep voltages from generator 35 are converted into respective digital numbers representing the instantaneous amplitudes of the sweep voltages by analog-to-digital converter 36. Each time that a defect image is scanned by vidicon 20', an output signal is generated on line 37 which causes the digital numbers concurrently appearing within analog-to-digital converter 36 to be shifted out and into buffer register 38. At the same time, the position of the mask 17 under test is sensed by quadrant detector 28'. The analog output from detector 28' is applied to analog-to-digital converter 39. The pair of digital signals from converter 39 representing the X and Y coordinates of the deviation of mask 17' from the optical axis 45 is combined in memory 40 with the pair of digital signals from buffer register 38 representing the coordinates of a respective defect in the mask 17' relative to the center of scan of vidicon 20' which is aligned with axis 45. Pairs of digital signals representing the corrected positions of respective detected defects relative to the optical axis 45 of the detecting system are stored in memory 40 for further processing by computer 41. Computer 41 has associated with it a memory 42 into which is inserted a predetermined set of X- and Y-coordinates representing the center of predetermined critical areas peculiar to the mask 17' under examination. Computer 41 receives the axis-stabilized defect data from memory 40 and the stored coordinates of the predetermined critical areas peculiar to the mask 17' under examination. Computer 41 receives the axis-stabilized defect data from memory 40 and the stored coordinates of the predetermined critical areas from memory 42 and determines which, if any, of the detected defects are within the predetermined critical areas. Computer 41 provides an output signal on line 43 each time that the corrected coordinates of a detected defect lie within a predetermined range relative to the coordinates of a known critical area. The predetermined range is determined analytically and/or empirically by the mask designer.

It will be noted that certain details not necessary to the present invention have been omitted from the simplified block diagram of FIG. 4 for the sake of clarity of exposition. In particular, the generation of the timing waveforms for operating the conventional digital components at the appropriate times is not shown. Various suitable means, however, will occur to those skilled in the art.

It can be seen from the preceding specification that the present invention achieves enhanced discrimination in favor of pattern defects and against the error-free portions of a pattern under examination by generating substantially a Fourier transform of the specimen pattern and then filtering out some or all of the frequency components of the transform corresponding to the frequency components of a defect free reference pattern. Where visual inspection of the specimen pattern is desired, it is advantageous not to filter out all of the frequency components corresponding to the transform of the error-free reference pattern. It is preferable in such a case to filter out only the lower frequency components and to allow the higher frequency components to pass through the filter as previously discussed.

Although the disclosed embodiments of the present invention are adapted for the examination of specimen microcircuit masks, the invention is fully suitable for the inspection of opaque specimens such as microcircuit wafers. In such cases, of course, it is necessary to arrange for the front surface illumination of the opaque specimen such as, for example, by the introduction of an inclined beam splitter between specimen 2 and lens 3 of FIG. 1. The source of coherent light then would be directed towards the inclined beam splitter. It will also be apparent to those skilled in the art that the amplitude distribution of the illuminated specimen patterns can be changed into a Fourier transform field distribution by optical means other than a lens such as a spherical mirror or convergent illumination beam.

While the invention has been particularly shown and described with reference to preferred embodiments thereof, it will be understood by those skilled in the art that the foregoing and other changes inform and details may be made therein without departing from the spirit and scope of the invention.

What is claimed is:

1. Apparatus for determining the presence of defects in a specimen pattern comprising:
   - a source of monochromatic collimated light for illuminating said pattern,
   - optical means for generating from said pattern an image representing substantially the Fourier transform of said pattern,
   - optical filter means receiving said image for blocking spatial frequency components of said image,
   - said filter means comprising a pattern having relatively transparent and relatively opaque portions, the relatively opaque portion conforming to substantially the Fourier transform of an error-free reference pattern corresponding to said specimen pattern, and
   - detector means for detecting the spatial frequency components of said image not blocked by said filter means.
2. Apparatus as defined in claim 1 wherein said pattern is a microcircuit mask.
3. Apparatus as defined in claim 1 wherein said specimen, said filter means and said photodetector means lie substantially along the same optical axis.
4. Apparatus for determining the presence of defects in a specimen pattern comprising:
   - a source of monochromatic collimated light for illuminating said pattern,
   - optical means for generating from said pattern an image representing substantially the Fourier transform of said pattern,
   - optical filter means receiving said image for blocking spacial frequency components for said image,
   - said filter means comprising a composite of a diffraction grating pattern and a pattern having relatively transparent and relatively opaque portions, the relatively opaque portion conforming to the Fourier transform of an error-free reference pattern corresponding to said specimen pattern, and
   - detector means for detecting the spacial frequency components of said image not blocked by said filter means.
5. Apparatus as defined in claim 4 wherein said specimen and said filter means lie along an optical axis inclined with respect to the optical axis of said photodetector means.
6. Apparatus as defined in claim 4 and further including means coupled to said detector means for producing signals representing the spatial coordinates of the portion of said pattern specimen which produces said spatial frequency components of said image not blocked by said filter means, and
   - means receiving said signals for responding only to those signals, if any, which represent predetermined spatial coordinates.